US012129355B2

(12) United States Patent
Napoli et al.

(10) Patent No.: US 12,129,355 B2
(45) Date of Patent: Oct. 29, 2024

(54) METHOD FOR MANUFACTURING A LUMINESCENT HOROLOGICAL COMPONENT

(71) Applicant: The Swatch Group Research and Development Ltd, Marin (CH)

(72) Inventors: Sophie Napoli, Neuchâtel (CH); Nicolas François, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 18 days.

(21) Appl. No.: 17/720,705

(22) Filed: Apr. 14, 2022

(65) Prior Publication Data

US 2022/0389190 A1    Dec. 8, 2022

(30) Foreign Application Priority Data

Jun. 8, 2021    (EP) .................................... 21178264

(51) Int. Cl.
| | | |
|---|---|---|
| *C08K 5/00* | (2006.01) | |
| *B29B 7/00* | (2006.01) | |
| *B29B 7/90* | (2006.01) | |
| *B29C 39/00* | (2006.01) | |
| *B29C 39/42* | (2006.01) | |
| *C08K 3/00* | (2018.01) | |
| *C08K 3/013* | (2018.01) | |
| *C08K 7/00* | (2006.01) | |
| *G04B 19/00* | (2006.01) | |
| *G04B 19/30* | (2006.01) | |
| *G04B 19/32* | (2006.01) | |
| *B29K 63/00* | (2006.01) | |
| *B29K 105/00* | (2006.01) | |
| *B29L 31/00* | (2006.01) | |

(52) U.S. Cl.
CPC .............. *C08K 5/0041* (2013.01); *B29B 7/90* (2013.01); *B29C 39/003* (2013.01); *B29C 39/42* (2013.01); *C08K 3/013* (2018.01); *B29C 2793/009* (2013.01); *B29C 2795/007* (2013.01); *B29K 2063/00* (2013.01); *B29K 2105/0032* (2013.01); *B29K 2995/0035* (2013.01); *B29L 2031/739* (2013.01); *C08K 2201/005* (2013.01)

(58) Field of Classification Search
CPC ....................... B29L 2031/739; C08K 5/0041
See application file for complete search history.

(56) References Cited

U.S. PATENT DOCUMENTS

| | | | | |
|---|---|---|---|---|
| 6,208,591 B1* | 3/2001 | Sakurazawa | ........... | G04B 19/30 313/110 |
| 6,226,232 B1* | 5/2001 | Ruchonnet | ............. | G02C 11/02 63/31 |
| 6,466,522 B1* | 10/2002 | Yoshioka | ............... | G04B 19/32 368/205 |
| 6,687,266 B1* | 2/2004 | Ma | .......................... | C09K 11/06 372/39 |
| 8,096,702 B2* | 1/2012 | Grotell | ................. | G04B 47/044 368/294 |
| 10,520,894 B2 | 12/2019 | Francois et al. | | |
| 2018/0095427 A1* | 4/2018 | Francois | ................ | G04B 37/08 |
| 2019/0391534 A1* | 12/2019 | Di Luna | ................. | C04B 35/44 |
| 2020/0383438 A1* | 12/2020 | Francois | .............. | A44C 27/001 |

FOREIGN PATENT DOCUMENTS

| | | | | | |
|---|---|---|---|---|---|
| CH | 716226 B1 | * | 11/2020 | ............. | G04B 19/32 |
| JP | H-11140351 A | * | 5/1999 | ............... | C09D 5/22 |
| JP | 11-281764 A | | 10/1999 | | |
| JP | H11281764 | * | 10/1999 | | |
| JP | 2003-185764 A | | 7/2003 | | |
| JP | 2005-227046 A | | 8/2005 | | |
| JP | 2008-164401 A | | 7/2008 | | |
| JP | 2018-40698 A | | 3/2018 | | |
| JP | 2018-59933 A | | 4/2018 | | |
| JP | 2021-17518 A | | 2/2021 | | |
| KR | 20030027146 A | * | 4/2003 | ............. | B44C 1/105 |
| KR | 20100099466 A | * | 9/2010 | ........... | C09D 167/06 |
| KR | 20190121672 A | * | 10/2019 | ................. | C08J 3/22 |

OTHER PUBLICATIONS

JPH11281764 (Karasawa) Oct. 1999 (online machine translation), [Retrieved on May 3, 2023]. Retrieved from: Espacenet (Year: 1999).*
Colson—https://www.dow.com/content/dam/dcc/documents/en-us/tech-art/109/109-52208-01-polyurethane-adhesives-and-sealants-based-on-hydrophobic-polyols.pdf?iframe=true (Year: 2015).*
Urebond, URE-BOND™ 90, 2016, https://www.smooth-on.com/products/ure-bond-90/ (Year: 2016).*
https://web.archive.org/web/20210224191725/https://en.wikipedia.org/wiki/Epoxy (Year: 2021).*
JPH-11140351-A (Iwasaki ) May 1999 (online machine translation), [Retrieved on Jun. 14, 2024]. Retrieved from: Google (Year: 1999).*
KR-20100099466-A (Gill) Sep. 2010 (online machine translation), [Retrieved on Jun. 14, 2024]. Retrieved from: Google (Year: 2010).*

(Continued)

Primary Examiner — Alison L Hindenlang
Assistant Examiner — Andres E. Behrens, Jr.
(74) Attorney, Agent, or Firm — Sughrue Mion, PLLC

(57) ABSTRACT

The present invention relates to a method for manufacturing a luminescent horological component for a portable object.

7 Claims, No Drawings

(56) References Cited

OTHER PUBLICATIONS

KR-20030027146-A (Hyeon) Apr. 2003 (online machine translation), [Retrieved on Jun. 14, 2024]. Retrieved from: Google (Year: 2003).*
KR 20190121672-A (Jun) Oct. 2019 (online machine translation), [Retrieved on Jun. 14, 2024]. Retrieved from: Google (Year: 2019).*
CH716226B1 (Klopfenstein) Nov. 2020 (online machine translation), [Retrieved on Jun. 14, 2024]. Retrieved from: Google (Year: 2020).*
European Search Report for EP 21178264 dated Oct. 20, 2021.

* cited by examiner

METHOD FOR MANUFACTURING A LUMINESCENT HOROLOGICAL COMPONENT

CROSS-REFERENCE TO RELATED APPLICATIONS

This application claims priority to European Patent Application No. 21178264.4 filed Jun. 8, 2021, the entire contents of which are incorporated herein by reference.

TECHNICAL FIELD

The invention relates to a method for manufacturing a luminescent horological component. The present invention also relates to such a horological component obtained using the manufacturing method.

TECHNOLOGICAL BACKGROUND

The use of photoluminescent materials is rather widespread on the market, for varied uses, such as the hands or the index.

The technology of phosphorescence is routinely used in the field of horology via various decoration methods in order to illuminate hands, dials and other components.

The technology of fluorescence is also used for the decoration of the internal casing components via pad printing or spraying using fluorescent pigments in order to decorate the watch, in several colours.

Moreover, dials and hands are usually made from a metal material then, after several termination steps, decorated with an ink that is either phosphorescent or fluorescent.

This design has several disadvantages:
- the limitation of the luminous performance, the thicknesses of the phosphorescent and fluorescent inks are limited to about one hundred microns with the current decoration methods;
- a complexification of the decoration methods, a white sublayer is indeed necessary before the phosphorescent decoration in order to have an opaque decoration and maximise the performance;
- the completely opaque components limiting the design.

SUMMARY OF THE INVENTION

The invention aims to provide a method for manufacturing a luminescent horological component that does not suffer from the disadvantages described above.

The present invention relates to a method for manufacturing a luminescent horological component for a portable object comprising the following steps:
- mixing an epoxy resin and a phosphorescent pigment in an amount of 40% by mass;
- adding to the mixture a fluorescent pigment in an amount of 3% by mass;
- optionally, adding silane to the mixture in an amount of 10% by mass;
- adding a hardener and mixing everything mechanically to obtain a homogenous solution;
- pouring under vacuum the solution obtained into a mould and cross-linking the solution to obtain a luminescent moulded part;
- after hardening, removing the part from the mould and machining it to obtain the luminescent horological component.

According to other advantageous alternatives of the invention:
- the method comprises a last optional step during which the horological component is decorated by printing or etching;
- the solution obtained is poured into the mould over a thickness of at least 0.4 mm;
- the resin used is chosen from the resins of the polyepoxide type or of the polyurethane type;
- the solution obtained is cross-linked for 4 hours at 80° C.,
- the hardener contains acid anhydride, phenol, amine, diisocyanates or triisocyanates with polyols containing at least two hydroxyl groups;
- the luminescent horological component formed is a dial or a hand.

The invention also relates to a luminescent horological component obtained using such a method.

The invention also relates to a timepiece including at least one such horological component.

DETAILED DESCRIPTION

The present invention relates to a method for manufacturing a luminescent horological component for a portable object, as well as the luminescent horological component obtained.

Luminescent means that the component is photoluminescent, fluorescent, phosphorescent, or a combination.

Phosphorescent means an element having the property of being able to absorb light and reemit it at a greater wavelength. The emission persists some time when the light excitation has stopped. The ink contains at least one photoluminescent agent to confer the properties of photoluminescence on the ink. Preferably, the luminescent agent is a fluorescent agent. It is, advantageously, chosen from the inorganic fluorophores and the organo-lanthanide complexes. According to another alternative, the fluorescent agent can also be chosen from the organic fluorophores. This can be, for example, fluoresceine, europium 1,3-diphenyl-1,3-propanedionate-1,10-phenantroline, doped gadolinium oxysulfide, doped barium magnesium aluminate, doped lithium aluminate, doped strontium molybdate.

Fluorescent means an element having the property of being able to absorb light and reemit it at a greater wavelength. The emission stops when the light excitation stops.

The various steps of the manufacturing method according to the invention will now be described.

During a first step, a mixture of a resin and of a phosphorescent pigment in an amount of 40% by mass is carried out in such a way as to obtain a sufficiently conspicuous daytime colour without making any compromises on the phosphorescent performance. The quantity of luminescent particles is chosen in such a way as to be sufficient to be able to make the decorated horological component stand out and make it easily and immediately visible in the dark. Such pigments can be for example Daylight Fluorescent Pigments from Aralon Colors, other types of pigments can of course be used.

The resin used can be a resin of the polyepoxide or polyurethane type. The polyepoxide resins routinely called "epoxy" are resins manufactured by polymerisation of epoxide monomers with a hardener.

Then a fluorescent pigment is added in an amount of 3% by mass, which allows to modify the colour visible during the day since the fluorescent pigments are coloured. They also allow to reinforce and modify the phosphorescent effect. For example if a "Light Blue" blue emission phosphorescent pigment is used and a pink fluorescent pigment is added, then the final colour of emission at night will be pinkish/violet. It is therefore possible to make the colour visible during the day correspond to the colour visible at night.

According to an optional embodiment of the invention, silane is added to the mixture in an amount of 10% by mass maximum to adjust the viscosity of the resin and thus make the deposition of the mixture in the mould faster and easier.

During the following step, a hardener is added and mechanical mixing is carried out, via a centrifugal planetary mixer of the Speedmixer type to obtain a homogenous solution and distribute the luminescent particles well in the resin and thus avoid clusters of particles that would have a negative effect on both the visual finish on the horological component and the performance of the luminescent ink.

The hardener can contain acid anhydride, phenol or amine. Polyurethane resins can also be used, by reacting di- or triisocyanates with polyols containing at least two hydroxyl groups.

The homogenous solution obtained is then poured under vacuum into a mould. The solution obtained is poured into the mould over a thickness of at least 0.4 mm, the thickness varying according to the horological component that it is desired to obtain at the end. It was noted by the inventors that under a thickness of 0.4 mm, the parts are too fragile and do not hold mechanically (for example a hand does not support its own weight). Thus, in order to guarantee good performance and good strength, a minimum thickness of 0.4 mm is required.

There is no upper thickness limit. It is possible to directly make the thickness of the part and blank the part if the latter is flat. It is also possible to mould thicker parts and machine them to also rework them in terms of thickness. For example, for hands in order to be able to blank the top of the hand wider and a finer foot.

Once moulded under vacuum, the homogenous solution is cross-linked to obtain a luminescent moulded part. The time and the temperature of cross-linking are of course made to vary according to the resin chosen. The cross-linking can for example be carried out for 4 hours at a temperature of 80° C.

Of course, the time and the temperature of cross-linking depend on the technical specifications of the resin used. In the present example, the cross-linking time of 4 hours at 80° C. corresponds to the parameters of the epoxy resin E2830.

Finally, once the cross-linking has been finished, the moulded part is removed from the mould to carry out a laser blanking and obtain the luminescent horological component.

Finally, a last optional step involves decorating by printing or etching the horological component obtained in such a way that only a luminescent part of the component is visible.

According to the invention, such a method allows to obtain a luminescent dial or hands.

Embodiment

An "E2830" epoxy resin manufactured by The Swatch Group R&D, Polymer Division is used.

A photoluminescent pigment in an amount of 40% by mass (particle size D50: 15-20 μm) is added to the E2830 resin.

A fluorescent pigment is then added in an amount of 3% by mass.

Silane (Dynasylan Glyeo from Evonik) in a maximum amount of 10% by mass, to be adjusted according to the desired viscosity of the mixture, is added to this mixture.

The mixture is homogenised and then the hardener is added.

Mechanical mixing is carried out using a machine such as a centrifugal planetary mixer of the Speedmixer type in order to have a homogenous solution.

The mixture thus obtained is then poured into a mould so as to have a thickness of 0.4 mm. The resin is then cross-linked according to the conditions stated by the provider (here for the E2830 resin, 4 hours in a furnace at 80° C.).

Once the shape has been removed from the mould, it is then blanked via laser in order to obtain the desired horological parts.

The invention claimed is:

1. A method for manufacturing a luminescent horological component for a portable object comprising the following steps:
   mixing an epoxy resin and a phosphorescent pigment in an amount of 40% by mass;
   adding to the mixture a fluorescent pigment in an amount of 3% by mass;
   optionally, adding silane to the mixture in an amount of 10% by mass;
   adding a hardener and mixing everything mechanically to obtain a homogenous solution;
   pouring under vacuum the solution obtained into a mould and cross-linking the solution to obtain a luminescent moulded part;
   after hardening, removing the part from the mould and blanking it by laser to obtain the luminescent horological component.

2. The manufacturing method according to claim 1, comprising a last step during which the horological component is decorated by printing or etching.

3. The manufacturing method according to claim 1, wherein the solution obtained is poured into the mould over a thickness of at least 0.4 mm.

4. The manufacturing method according to claim 1, wherein the solution obtained is cross-linked for 4 hours at 80° C.

5. The manufacturing method according to claim 1, wherein the hardener contains acid anhydride, phenol, amine, diisocyanates or triisocyanates with polyols containing at least two hydroxyl groups.

6. The manufacturing method according to claim 1, wherein the luminescent horological component formed is a dial or a hand.

7. Luminescent horological component obtained via a method according to claim 1.

* * * * *